(12) United States Patent
Xu et al.

(10) Patent No.: US 12,449,388 B2
(45) Date of Patent: Oct. 21, 2025

(54) MEMS GAS SENSOR AND ARRAY THEREOF, AND GAS DETECTION AND PREPARATION METHOD

(71) Applicant: Wiinaa Co., Ltd., Anhui (CN)

(72) Inventors: Lei Xu, Anhui (CN); Dongcheng Xie, Anhui (CN); Dongliang Chen, Anhui (CN)

(73) Assignee: Wiinaa Co., Ltd., Anhui (CN)

( * ) Notice: Subject to any disclaimer, the term of this patent is extended or adjusted under 35 U.S.C. 154(b) by 305 days.

(21) Appl. No.: 17/906,920

(22) PCT Filed: Jul. 10, 2020

(86) PCT No.: PCT/CN2020/101406
§ 371 (c)(1),
(2) Date: Sep. 21, 2022

(87) PCT Pub. No.: WO2021/189718
PCT Pub. Date: Sep. 30, 2021

(65) Prior Publication Data
US 2023/0341367 A1 Oct. 26, 2023

(30) Foreign Application Priority Data
Mar. 26, 2020 (CN) .......................... 202010222341.9

(51) Int. Cl.
*G01N 27/12* (2006.01)
*B81B 7/00* (2006.01)
(Continued)

(52) U.S. Cl.
CPC ......... *G01N 27/128* (2013.01); *B81B 7/0009* (2013.01); *B81B 7/02* (2013.01);
(Continued)

(58) Field of Classification Search
CPC ............. G01N 33/0031; G01N 27/125; G01N 27/128; B81B 7/0009; B81B 7/02; B81B 2201/02; B81B 2201/0292; B81C 1/00642
See application file for complete search history.

(56) References Cited

U.S. PATENT DOCUMENTS

| 5,019,885 A | 5/1991 | Yagawara et al. |
| 5,406,841 A | 4/1995 | Kimura |

(Continued)

FOREIGN PATENT DOCUMENTS

| CN | 101290302 A | 10/2008 |
| CN | 102359980 A | 2/2012 |

(Continued)

OTHER PUBLICATIONS 20927023.0-EP European search report, Date Jun. 12, 2023, 10 pages.

(Continued)

*Primary Examiner* — Benjamin R Schmitt
(74) *Attorney, Agent, or Firm* — BROOKS KUSHMAN P.C.

(57) ABSTRACT

A MEMS gas sensor (A) and array (B) thereof, a gas detection and preparation method. The gas sensor (A) comprises a first substrate (A2) with a cavity (A1) provided in a first surface, and a gas detection assembly (A3) arranged at an opening of the cavity The gas detection assembly comprises: a supporting suspension bridge (A31) erected on the opening of the cavity, and a gas detection part (A32) arranged on the supporting suspension bridge. The gas detection part comprises a strip-shaped heating electrode part (A321), an insulating layer (A322), a strip-shaped detection electrode part (A323) and a gas-sensitive material part (A324), which are sequentially stacked. The strip-shaped detection electrode part comprises a first detection
(Continued)

electrode part (A323-1) and a second detection electrode part (A323-2), with a first opening (A325) provided between the A323-1 and A323-2; the gas-sensitive material part is arranged at the position of the first opening.

17 Claims, 14 Drawing Sheets

(51) Int. Cl.
    *B81B 7/02*     (2006.01)
    *B81B 7/04*     (2006.01)
    *B81C 1/00*     (2006.01)
    *G01N 33/00*     (2006.01)

(52) U.S. Cl.
    CPC ............ *B81B 7/04* (2013.01); *B81C 1/00642* (2013.01); *G01N 27/125* (2013.01); *G01N 33/0031* (2013.01); *B81B 2201/02* (2013.01); *B81B 2201/0292* (2013.01)

(56) References Cited

U.S. PATENT DOCUMENTS

| | | | |
|---|---|---|---|
| 5,980,833 | A | 11/1999 | Higaki et al. |
| 9,459,224 | B1 | 10/2016 | Cheng et al. |
| 2010/0279425 | A1 | 11/2010 | Patel |
| 2010/0314700 | A1 | 12/2010 | Park |
| 2015/0285772 | A1 | 10/2015 | Park et al. |
| 2016/0011158 | A1 | 1/2016 | Liu et al. |
| 2020/0003718 | A1 | 1/2020 | Bartsch et al. |

FOREIGN PATENT DOCUMENTS

| | | | | | |
|---|---|---|---|---|---|
| CN | 102359981 | A | | 2/2012 | |
| CN | 103558265 | A | | 2/2014 | |
| CN | 104297303 | A | | 1/2015 | |
| CN | 106629575 | A | | 5/2017 | |
| CN | 107941859 | A | | 4/2018 | |
| CN | 110108757 | A | | 8/2019 | |
| CN | 111289582 | A | | 6/2020 | |
| EP | 2930500 | A1 | | 10/2015 | |
| EP | 3531119 | A1 | * | 8/2019 | ........... G01N 27/128 |
| JP | S58103654 | A | | 6/1983 | |
| JP | H02134551 | A | | 5/1990 | |
| JP | H02138858 | A | | 5/1990 | |
| JP | H08278273 | A | | 10/1996 | |
| JP | 2011033592 | A | | 2/2011 | |
| JP | 2014153135 | A | | 8/2014 | |
| JP | 2015200644 | A | | 11/2015 | |
| JP | 2016102758 | A | | 6/2016 | |
| JP | 2017090188 | A | | 5/2017 | |
| KR | 20050097421 | A | | 10/2005 | |
| KR | 100845717 | B1 | | 7/2008 | |
| KR | 20110108527 | A | | 10/2011 | |
| KR | 20190012373 | A | | 2/2019 | |
| KR | 20190014981 | A | | 2/2019 | |
| WO | 2010120297 | | | 10/2010 | |
| WO | 2011115321 | A1 | | 9/2011 | |

OTHER PUBLICATIONS

202247058154-IN First Examination Report, Date Jan. 17, 2023, 5 pages.
International Search report for PCT/CN2020/101406, prepared by the China National Intellectual Property Administration, mailing date Dec. 25, 2020, 6 pages including the English Translation.
Notification of Rejection Decision of 202010222341.9, prepared by the China National Intellectual Property Administration, dated Sep. 10, 2021, 29 pages with English translation.
The first office action with English translation 202010222341.9, prepared by the China National Intellectual Property Administration, dated Mar. 30, 2021.
The second office action with English translation 202010222341.9, prepared by the China National Intellectual Property Administration, dated Jun. 28, 2021.
Japanese Notice of Reasons for Refusal, prepared by the Japanese Patent Office for JP Patent Application No. 2023-500115, Dated Oct. 24, 2023, 8 pages including the English Translation.

* cited by examiner

MEMS GAS SENSOR AND ARRAY THEREOF, AND GAS DETECTION AND PREPARATION METHOD

CROSS-REFERENCE TO RELATED APPLICATIONS

The present application is a U.S. National Phase Entry of International Application No. PCT/CN2020/101406 having an international filing date of Jul. 10, 2020, which claims priority to Chinese Patent Application No. 202010222341.9, filed to the CNIPA on Mar. 26, 2020 and entitled "MEMS Gas Sensor and Array thereof, and Gas Detection and Preparation Method". The above-identified applications are incorporated into the present application by reference in their entirety.

TECHNICAL FIELD

The present disclosure relates to, but is not limited to, the field of gas detection technologies, and in particular to, a Micro-Electro-Mechanical System (MEMS) gas sensor and array thereof, a gas detection method, and a preparation method thereof.

BACKGROUND

Odor recognition is one of important application fields of gas sensors. Metal-oxide semiconductor gas sensors are widely used in odor recognition devices for their excellent characteristics such as low power consumption, low cost, high integration, and good response to various gases. Metal-Oxide Semiconductor (MOS)-type Micro-Electro-Mechanical System (MEMS) gas sensors are researched mainly based on closed film type and suspended film type. The former has a relatively high mechanical strength, and the latter has a relatively fast thermal response speed. However, the above types of gas sensors still have a problem of relatively large power consumption.

SUMMARY

The following is a summary of the subject matter described in detail herein. This summary is not intended to limit the protection scope of claims.

Embodiments of the present disclosure provide a MEMS gas sensor and array thereof, a gas detection method, and a preparation method thereof.

In one aspect, an embodiment of the present disclosure provides a MEMS gas sensor, which may include: a first base substrate with a first surface on which a cavity is provided, and a gas detection component disposed at an opening of the cavity, wherein the gas detection component may include: a support suspension bridge erected at a first edge and a second edge of the opening of the cavity, and a gas detection part disposed on a side of the support suspension bridge away from the cavity, wherein the gas detection part includes a strip-shaped heating electrode part, an insulation layer, a strip-shaped detection electrode part, and a gas sensitive material part, that are stacked sequentially, the strip-shaped detection electrode part includes a first detection electrode part and a second detection electrode part, a first opening is provided between the first detection electrode part and the second detection electrode part, the gas sensitive material part is provided at a position of the first opening, a first end of the gas sensitive material part is connected with the first detection electrode part, and a second end of the gas sensitive material part is connected with the second detection electrode part.

In another aspect, an embodiment of the present disclosure also provides a gas detection method of a MEMS gas sensor, wherein the MEMS gas sensor is any one of the above MEMS gas sensors; the method may include: selecting any one or more gas detection parts in the MEMS gas sensor, applying a heating voltage to a strip-shaped heating electrode part in a gas detection part, and acquiring a voltage value between a first detection electrode part and a second detection electrode part in the gas detection part.

In still another aspect, an embodiment of the present disclosure also provides a MEMS gas sensor array, which may include multiple MEMS gas sensors of any of the MEMS gas sensors described above.

In yet another aspect, an embodiment of the present disclosure also provides a preparation method of a MEMS gas sensor, wherein the MEMS gas sensor is one of the above MEMS gas sensors; the method may include: preparing a first base substrate; forming a support film on a first surface of the first base substrate; forming a gas detection part on the support film, wherein the gas detection part includes a strip-shaped heating electrode part, an insulation layer, a strip-shaped detection electrode part, and a gas sensitive material part, which are stacked sequentially, the strip-shaped detection electrode part includes a first detection electrode part and a second detection electrode part, a first opening is provided between the first detection electrode part and the second detection electrode part, the gas sensitive material part is disposed at a position of the first opening, a first end of the gas sensitive material part is connected with the first detection electrode part, and a second end of the gas sensitive material part is connected with the second detection electrode part; and processing the support film to acquire a support suspension bridge, and forming one or more cavities on a first surface of the first base substrate, wherein the support suspension bridge is erected at a first edge and a second edge of an opening of a cavity.

Other aspects will become apparent after drawings and detailed description are read and understood.

DETAILED DESCRIPTION

Multiple embodiments are described herein but the description is intended to be illustrative and not restrictive. Except expressly limited, any feature or element of any embodiment may be used in combination with, or may be a substitute for, any other feature or element of any other embodiment.

Figure 1:
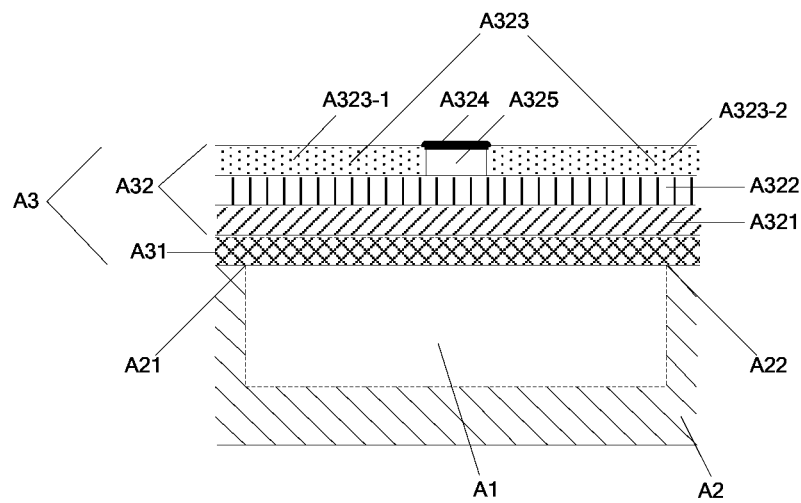
FIG. 1 is a cross-sectional view of a composition structure of a MEMS gas sensor according to an exemplary embodiment of the present disclosure.
Figure 2:
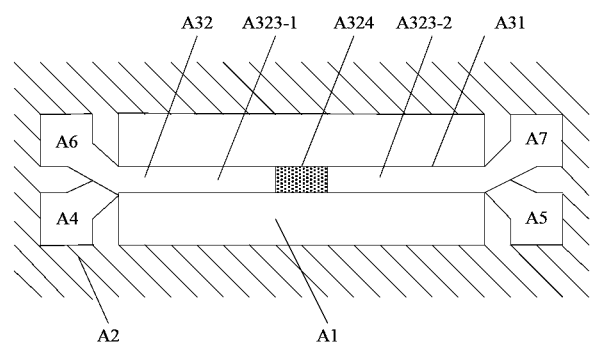
FIG. 2 is a top view of a composition structure of a MEMS gas sensor according to an exemplary embodiment of the present disclosure.

In an exemplary embodiment, a MEMS gas sensor A is provided, as shown in FIGS. 1 and 2, which may include a first base substrate A2 having a first surface on which a cavity A1 is provided, a gas detection component A3 disposed at an opening of the cavity, wherein the gas detection component A3 may include: a support suspension bridge A31 erected at a first edge A21 and a second edge A22 of the cavity opening, and a gas detection part A32 disposed on a side of the support suspension bridge A31 away from the cavity, wherein the gas detection part A32 includes a strip-shaped heating electrode part A321, an insulation layer A322, a strip-shaped detection electrode part A323, and a gas sensitive material part A324, that are stacked sequentially. The strip-shaped detection electrode part A323 includes a first detection electrode part A323-1 and a second detection electrode part A323-2, a first opening A325 is provided between the first detection electrode part A323-1 and the second detection electrode part A323-2, the gas sensitive material part A324 is provided at a position of the first opening A325, a first end of the gas sensitive material part A324 is connected with the first detection electrode part A323-1, and a second end of the gas sensitive material part A324 is connected with the second detection electrode part A323-2.

In an exemplary embodiment, the cavity A1 may include one or more cavities, the gas detection component A3 may be one or more, and correspondingly, the support suspension bridge A31 erected on each cavity A1 may include one or more support suspension bridges. In the present disclosure, there is no limit on the number of cavities A1 and the number of support suspension bridges A31.

In an exemplary embodiment, the cavity A1 is not limited to being disposed on one surface of the first base substrate A2, and cavities A1 may be disposed on multiple surfaces of the first base substrate A2, and correspondingly, one or more gas detection components A3 may be disposed on cavities A1 on different surfaces.

The MEMS gas sensor according to this embodiment of the present disclosure is manufactured by using a MEMS process, which realizes manufacturing and packaging of the sensor using a single process. A mass manufacturing process of gas sensors may be greatly simplified, a cost thereof may be greatly reduced, efficiency may be improved, a manufacturing cycle may be shortened, which can be beneficial to improving consistency and stability of the sensors. An effective region of a sensor is manufactured on a strip-shaped support suspension bridge by using a strip-shaped support suspension bridge structure, which omits a heater structure of serpentine winding, spiral winding, or zigzag winding, and an interdigital electrode structure, greatly reducing power consumption of a gas sensor and improving a thermal response speed. The above support suspension bridge is supported through two edges of a cavity, and when a heating electrode part in a gas detection component is electrified, especially when a gas sensitive material needs to be heated to a relatively high temperature, better support property can still be ensured.

According to a solution of this embodiment, a support suspension bridge is used as a sensing part (i.e., a gas sensitive material part) of a gas sensor, thermal mass is small and power consumption is low.

In an exemplary embodiment, in combination with FIGS. 1 and 2, a following pin connection mode may be used for the MEMS gas sensor A. The MEMS gas sensor A includes a heating electrode pin A4, a first ground pin A5, a detection electrode pin A6, and a second ground pin A7, that are disposed on the first base substrate A2. The heating electrode pin A4 is connected with a first end of the strip-shaped heating electrode part A321, and a second end of the strip-shaped heating electrode part A321 is connected with the first ground pin A5, so as to form a heating circuit. A first end of the first detection electrode part A323-1 is connected with a first end of the gas sensitive material part A324, and a second end of the first detection electrode part A323-1 is connected with the detection electrode pin A6; a first end of the second detection electrode part A323-2 is connected with a second end of the gas sensitive material part A324, and a second end of the second detection electrode part A323-2 is connected with the second ground pin A7, so as to form a detection circuit.

In an exemplary embodiment, the cavity A1 may include one or more cavities; wherein multiple gas detection components A3 may be respectively disposed at different positions of a cavity opening of any one cavity A1; or gas detection components A3 may be respectively disposed at different positions of a cavity opening of each of any multiple cavities A1; or one gas detection component A3 may be disposed at a cavity opening of each of any multiple cavities A1; or one gas detection component A3 may be disposed at a cavity opening of any one cavity A1.

For example, in an exemplary embodiment, the base substrate may include one cavity provided with a gas detection component, only one gas detection component may be provided in the one cavity, or multiple gas detection components may be provided at different positions of the cavity. In another exemplary embodiment, the base substrate may include multiple (two or more) cavities provided with gas detection components, wherein only one gas detection component may be disposed in each cavity, or multiple gas detection components may be disposed in each cavity, or in the multiple cavities, only one gas detection component is disposed in some of the cavities and multiple gas detection components are disposed in each of other cavities.

For another example, in another exemplary embodiment, the base substrate may include multiple cavities, wherein one or more gas detection components may be disposed in some of the cavities, and no gas detection component may be disposed in other cavities.

In another exemplary embodiment, it is not excluded that a gas detection component may cross multiple cavities, for example, one gas detection component A3 is erected over multiple cavities 1; or, multiple gas detection components A3 are erected above multiple cavities 1; wherein each gas detection component A3 is erected above multiple cavities A1.

An exemplary embodiment in which one cavity A1 is provided on a first base substrate A2 and one support suspension bridge A31 is erected on one cavity A1 is shown in FIG. 2, that is, in this exemplary embodiment, one gas detection component A3 is provided at a cavity opening of one cavity A1.

Figure 3:
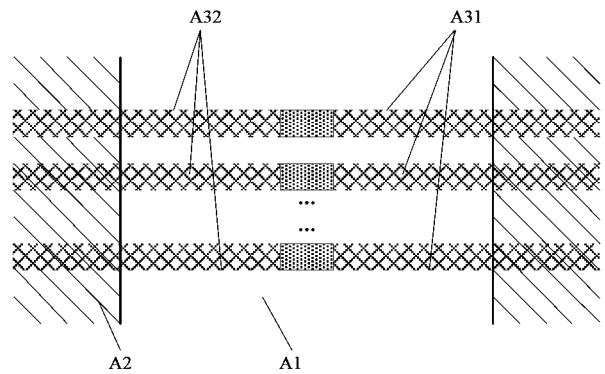
FIG. 3 is a schematic diagram of a cavity provided on a first base substrate and multiple gas detection components provided at a cavity opening according to an exemplary embodiment of the present disclosure.

An exemplary embodiment in which one cavity A1 is provided on a first base substrate A2, and multiple support suspension bridges A31 are erected on one cavity A1 is shown in FIG. 3, that is, in this exemplary embodiment, multiple gas detection components A3 are provided in one cavity A1.

Figure 4:
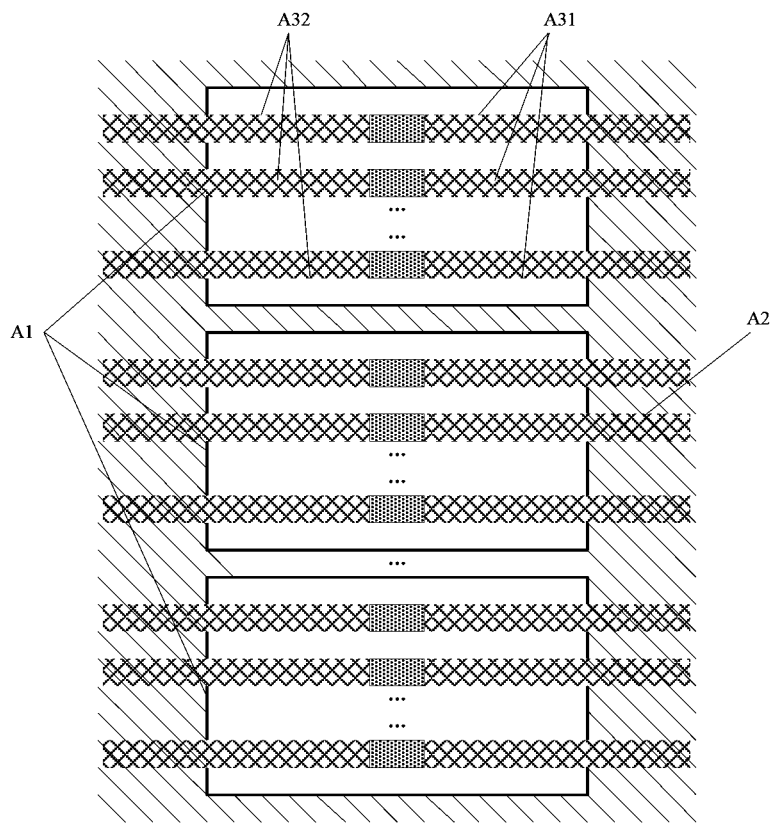
FIG. 4 is a schematic diagram of multiple cavities provided on a first base substrate and multiple gas detection components provided at multiple cavity openings according to an exemplary embodiment of the present disclosure.

An exemplary embodiment in which multiple cavities A1 are provided on a first base substrate A2, and multiple support suspension bridges A31 are erected on each cavity A1 is shown in FIG. 4. That is, in this exemplary embodiment, multiple gas detection components A3 are provided in each cavity A1. Three cavities are taken as an example in FIG. 4. In other embodiments, two cavities or more than three cavities may be provided.

Figure 5:
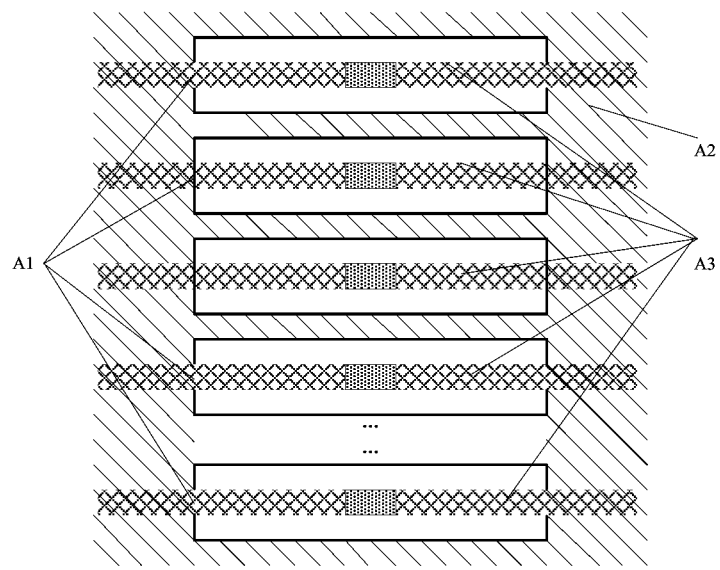
FIG. 5 is a schematic diagram of multiple cavities provided on a first base substrate and one gas detection component provided at each cavity opening according to an exemplary embodiment of the present disclosure.

An exemplary embodiment in which multiple cavities A1 are provided on a first base substrate A2, and one support suspension bridge A31 is erected on each cavity A1 is shown in FIG. 5, that is, in this exemplary embodiment, one gas detection component A3 is provided in each cavity A1. The number of cavities in FIG. 5 is only an example, and an actual number may be set as needed.

In an exemplary embodiment of the present disclosure, a shape of an opening of a cavity A1 is not limited, for example, it may be a square, a rectangle, a circle, a ring, or an irregular shape, etc.

Figure 6A:
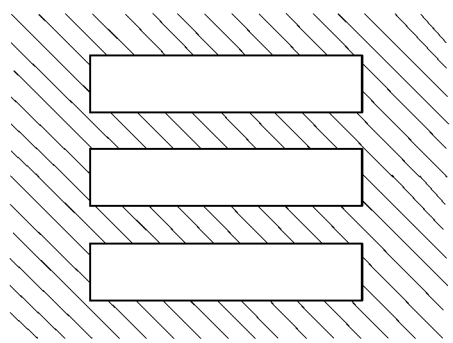
FIGS. 6A to 6D are schematic diagrams of an arrangement of cavities according to exemplary embodiments of the present disclosure.
Figure 6B:
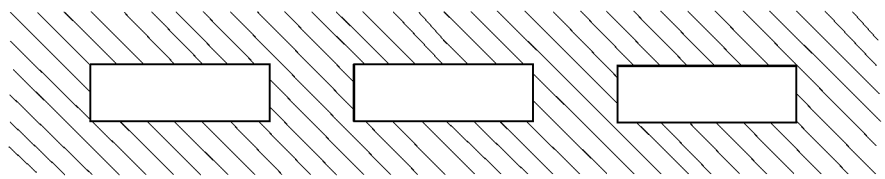
Figure 6C:
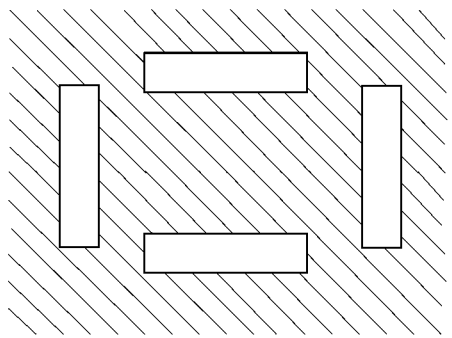
Figure 6D:
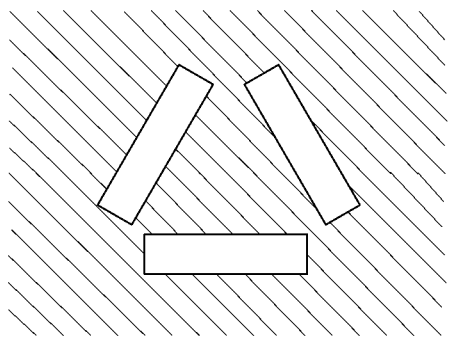
Figure 7A:
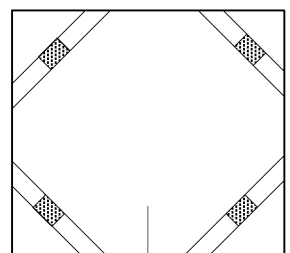
FIG. 7A to 7C are schematic diagrams of an arrangement of gas detection components or gas detection parts in any cavity according to exemplary embodiments of the present disclosure.
Figure 7B:
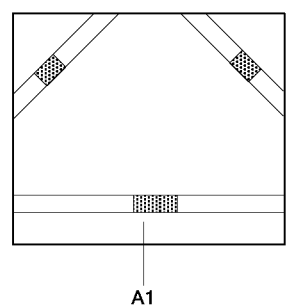
Figure 7C:
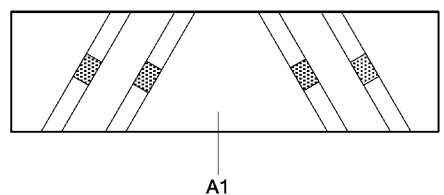

In an exemplary embodiment of the present disclosure, an arrangement of multiple cavities A1 may include, but is not limited to, any one or more of the following: a side-by-side arrangement, an arrangement along a straight line, and an arrangement according to a preset geometric shape (for example, they may be arranged in an array or arranged in a symmetric geometric shape or arranged in an asymmetrical geometric shape), as shown in FIGS. 6A to 6D. FIG. 6A is an example of a side-by-side arrangement of cavities, FIG. 6B is an example of an arrangement in which cavities are arranged along a straight line, and FIGS. 6C and 6D are examples of arrangements of geometric figures. In FIGS. 6A to 6D, a case in which cavities are rectangular is only taken as an example for illustration, and the number of cavities is also only for an illustrative purpose. In other embodiments, the number and the shape of cavities may be set as needed. An arrangement of multiple support suspension bridges A31 at an opening of any one cavity A1 may be changed in various ways according to different arrangements of cavities, for example, it may include, but is not limited to, any one or more of the following: a side-by-side arrangement and an arrangement according to a preset shape (the preset geometric figure may be symmetrical or asymmetrical). An example of a side-by-side arrangement of strip-shaped gas detection components is shown in FIG. 3 or FIG. 4, and examples of strip-shaped gas detection components arranged according to a preset figure are shown in FIGS. 7A to 7C (only schematic diagrams of gas detection components at cavities are shown in the figures). In FIGS. 7A to 7C, a case in which cavities are rectangular is only taken as an example for illustration, and the number of strip-shaped gas detection components is also only for an illustrative purpose. In other embodiments, the number of cavities and the number of strip-shaped gas detection components may be set as needed.

In examples shown in FIG. 2, FIG. 3, FIG. 4, and FIG. 5, a shape of the support suspension bridge A31 is a strip. In examples shown in FIGS. 4 and 5, an embodiment, in which multiple cavities are arranged side by side when there are multiple cavities A1, is provided. In examples shown in FIGS. 3 and 4, an embodiment, in which multiple support suspension bridges A31 are arranged side by side when the multiple support suspension bridges A31 are contained at one cavity opening, is provided.

In an exemplary embodiment, when multiple support suspension bridges A31 are contained at one cavity opening, the multiple support suspension bridges A31 may be symmetrically distributed, which can reduce power consumption.

In an exemplary embodiment, when multiple support suspension bridges A31 at one cavity opening are symmetrically distributed, the multiple support suspension bridges A31 may surround to form a symmetrical polygon, circle, ellipse, or a mirror-symmetrical shape, etc. For example, multiple support suspension bridges A31 may be erected to form a regular polygon (e.g., a regular triangle, a square, or a regular pentagon). For another example, multiple support suspension bridges A31 may be arranged in an arc shape, and multiple arc-shaped support suspension bridges may form a circular or elliptical shape. For another example, multiple support suspension bridges may be arranged in a mirror-symmetrical shape with a surface as an axis. For another example, multiple V-shaped support suspension bridges A31 at one cavity opening may form a fishbone shape without a main bone.

In an exemplary embodiment, support suspension bridges A31 at multiple cavity openings may also together form one or more shapes (the shapes may include, but are not limited to, geometric shapes, character shapes, and/or any preset pattern, etc., for example, trademarks, or trademark abbreviations), the shapes may be symmetrical, for example, support suspension bridges A31 provided at two cavity openings together form a fishbone shape (the fishbone shape is provided with a main bone).

For example, when there are multiple cavities, multiple support suspension bridges A31 at multiple cavity openings may be distributed in mirror symmetry to form a mirror-symmetrical shape. For example, when two cavities are provided, multiple support suspension bridges are arranged side by side at each cavity opening, and support suspension bridges at two cavity openings are arranged symmetrically with a surface between the two cavities perpendicular to the base substrate as an axis. Support suspension bridges at the two cavity openings are arranged like fish bones.

In the above exemplary embodiments, for convenience of description, description is made by taking an arrangement of support suspension bridges as an example, and an arrangement of gas detection components or gas detection parts is the same as the arrangement of the support suspension bridges. As may be seen from FIG. 1, each support suspension bridge has a gas detection part. When the support suspension bridge is strip-shaped, a heating electrode part, an insulation layer, and a detection electrode part of the gas detection part on the support suspension bridge are also strip-shaped.

In an exemplary embodiment, the cavity A1 may include one or more cavities, multiple gas detection components A3 at a cavity opening of any one cavity A1 may share a pin, or multiple gas detection components A3 at cavity openings of any multiple cavities A1 may share a pin. Sharing the pin may save trace space. The multiple gas detection components A3 share a pin, which may include one or more of the following: strip-shaped heating electrode parts A321 of the multiple gas detection components A3 share the first ground pin A5; strip-shaped detection electrode parts A321 of the multiple gas detection components A3 share the second ground pin A7; and strip-shaped detection electrode parts A321 of the multiple gas detection components A3 share the detection electrode pin A6.

Figure 8:
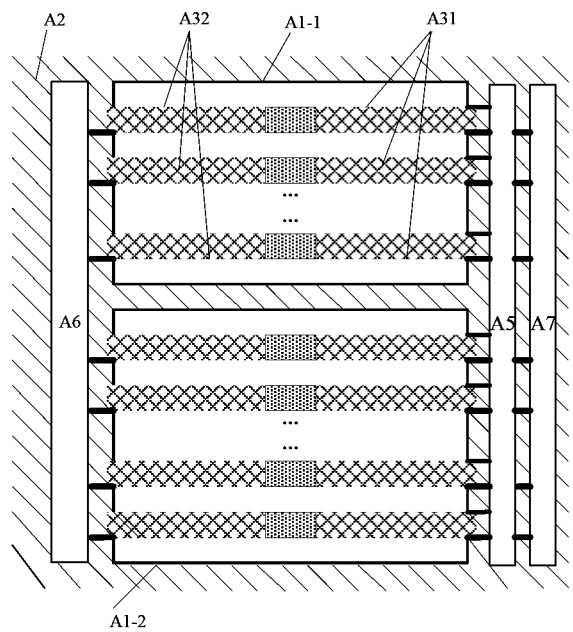
FIG. 8 is a schematic diagram of sharing a pin by multiple gas detection components of a first cavity and multiple gas detection components of a second cavity according to an exemplary embodiment of the present disclosure.

In an exemplary embodiment, as shown in FIG. 8, the any multiple cavities A1 may include a first cavity A1-1 and a second cavity A1-2. Taking the first cavity A1-1 and the second cavity A1-2 as an example for illustration, multiple gas detection components A3 at cavity openings of any multiple cavities A1 share a pin, which may include: m gas detection components A3 at a cavity opening of the first cavity A1-1 in the any multiple cavities share a first ground pin A5 and a second ground pin A7 with n gas detection components A3 at a cavity opening of the second cavity A1-2 in the any multiple cavities. For example, the first ground pin A5 is shared by m strip-shaped heating electrode parts in the m gas detection components A3 and n strip-shaped heating electrode parts in the n gas detection components A3, and the second ground pin A7 is shared by m strip-shaped detection electrode parts in the m gas detection components A3 and n strip-shaped detection electrode parts in the n gas detection components A3. A pin shape and a trace manner shown in FIG. 8 are only an example, and in other embodiments, a shape and/or position of a ground pin may be different, for example, an area of the ground pin may be smaller, and correspondingly, a total length of leads between electrode parts and the ground pin may be increased. In addition to being connected through a lead, in an exemplary embodiment, an electrode part and a pin may be directly connected.

In an exemplary embodiment, both m and n are positive integers, and m and n may be the same or different.

In an exemplary embodiment, the first ground pin A5 and the second ground pin A7 may be disposed between the first cavity A1-1 and the second cavity A1-2.

In an exemplary embodiment, both the first ground pin A5 and the second ground pin A7 may be made into a ring shape that may be disposed around multiple cavities A1 (such as the first cavity A1-1 and the second cavity A1-2), so that gas detection components A3 in the multiple cavities are connected with the first ground pin A5 and the second ground pin A7.

In an exemplary embodiment, the m gas detection components and the n gas detection components may share one detection electrode pin A6. In another exemplary embodiment, the detection electrode pin A6 may include a first detection electrode pin and a second detection electrode pin. The m gas detection components A3 may share the first detection electrode pin, and the n gas detection components may share the second detection electrode pin.

In an exemplary embodiment, the first cavity A1-1 and the second cavity A1-2 may respectively be provided with their own shared detection electrode pins (e.g., the first detection electrode pin and the second detection electrode pin), or may share one detection electrode pin.

In an exemplary embodiment, as shown in FIG. 8, a schematic diagram of an embodiment, in which the first cavity A1-1 and the second cavity A1-2 share one detection electrode pin A6, is provided.

In an exemplary embodiment, gas sensitive materials used for multiple gas sensitive material parts A324 may all be different; or, a same gas sensitive material is used for at least two gas sensitive material parts A324.

In an exemplary embodiment, the gas sensitive material may include any one or more of the following: tin oxide, indium oxide, tungsten oxide, and zinc oxide.

An exemplary embodiment of a fishbone-shaped MEMS gas sensor is provided below. In this exemplary embodiment, multiple gas detection components are provided on a surface of a first base substrate, and the multiple gas detection components are arranged in a shape like fish bones.

In an exemplary embodiment, a fishbone-shaped MEMS gas sensor may include two cavities; multiple gas detection components may be provided on each cavity, that is, multiple support suspension bridges A31, e.g. 2, 3, 4 or more support suspension bridges, are provided, and the number of gas detection components may be set as needed or determined according to a size of the sensor, i.e., an area of the surface of the first base substrate; and each support suspension bridge A31 may be provided with one gas detection part A32.

In an exemplary embodiment, a fishbone-shaped MEMS gas sensor may include: multiple heating electrode pins A4 corresponding to multiple strip-shaped heating electrode parts A321 in multiple gas detection parts A32. A case in which two cavities are provided and four gas detection components are disposed at each cavity opening is taken as an example. Four support suspension bridges A31 are disposed on one cavity, so there are corresponding four strip-shaped heating electrode parts. Therefore, on the surface of the base substrate, four heating electrode pins A4 are disposed on one side of the cavity, a total of eight support suspension bridges A31 are provided on two cavities, eight strip-shaped heating electrode parts are provided correspondingly, and accordingly, a total of eight heating electrode pins A4 are provided. The number of heating electrode pins A4 is determined according to the number of heating electrode parts.

Taking two cavities provided as an example, a fishbone-shaped MEMS gas sensor may include: two detection electrode pins A6, wherein a strip-shaped detection electrode part A323 in a gas detection component at each cavity opening shares one detection electrode pin A6, i.e., the number of detection electrode pins may be determined according to the number of cavities. In another exemplary embodiment, only one detection electrode pins A6 may be provided, i.e., strip-shaped detection electrode parts A323 in all gas detection components share one detection electrode pin A6.

In an exemplary embodiment, a fishbone-shaped MEMS gas sensor may include: one first ground pin A5 and one second ground pin A7. Strip-shaped detection electrode parts A323 in multiple gas detection components at two cavity openings all share the second ground pin A7, and strip-shaped heating electrode parts A321 in the multiple gas detection components at the two cavity openings all share the first ground pin A5.

In an exemplary embodiment, in order to save space, a first ground pin A5 and a second ground pin A7 of a fishbone-shaped MEMS gas sensor may both be disposed at a position between two cavities, and be disposed in different layers.

Figure 9:
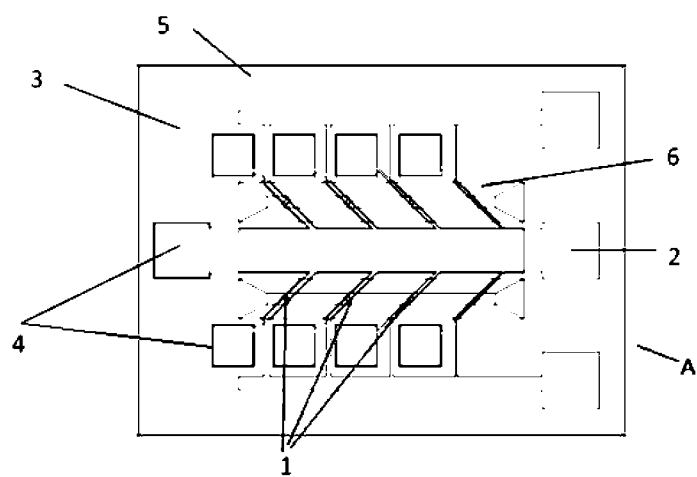
FIG. 9 is a schematic diagram of a composition structure of a fishbone-shaped MEMS gas sensor according to an exemplary embodiment of the present disclosure.

In an exemplary embodiment, as shown in FIG. 9, a fishbone-shaped MEMS gas sensor A may include, sequentially, from top to bottom: a gas sensitive material layer 1 (a layer where a gas sensitive material part A324 is located), a gas detection electrode layer 2 (a layer where a strip-shaped detection electrode part A323, a detection electrode pin A6, and a second ground pin A7 are located), an isolation film layer 3 (a layer where an insulation layer A322 between a strip-shaped heating electrode part A321 and a strip-shaped detection electrode part A323 is located), a heater layer 4 (a layer where the strip-shaped heating electrode part A321, a heating electrode pin A4, and a first ground pin A5 are located), a support film layer 5 (a layer where a support suspension bridge A31 is located), and a base substrate layer 6 (a layer where a first base substrate A2 is located).

Figure 10:
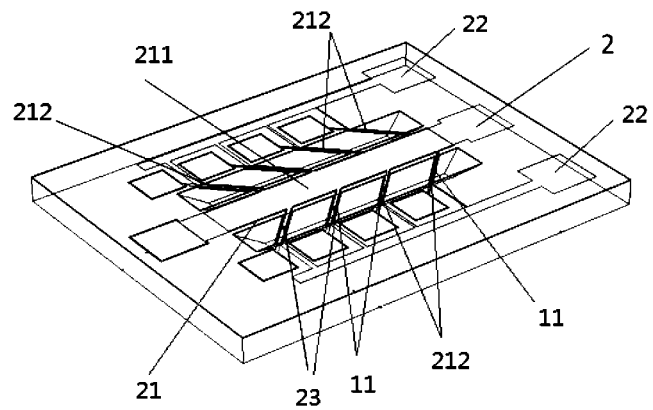
FIG. 10 is a schematic diagram of a fishbone structure in a fishbone-shaped MEMS gas sensor according to an exemplary embodiment of the present disclosure.

In an exemplary embodiment, as shown in FIG. 10, a fishbone-shaped structure 21 in a fishbone-shaped MEMS gas sensor may include: a main bone 211 (provided with a first ground pin A5 and a second ground pin A7) and branch bones 212 (composed of gas detection components, each gas detection component including a support suspension bridge A31 and a gas detection part A32 provided on the support suspension bridge A31) distributed on two sides of the main bone 211. The number of branch bones is not limited, and is determined according to the number of gas detection components. In an exemplary embodiment, each of the two sides of the main bone 211 may include four branch bones 212; and a gas detection electrode pin 22 (i.e., a detection electrode pin A6) is connected with a gas sensitive material part A324 at an electrode detection site 23 (i.e., a first opening A325) through a first detection electrode part A323-1.

In an exemplary embodiment, the fishbone-shaped MEMS gas sensor may be a fishbone-shaped programmable MEMS gas sensor having multiple heating electrode pins through which a programmed voltage may be input. Widths of the main bone 211 and the branch bones 212 may be self-defined according to actual needs, and the number of the branch bones 212 may also be self-defined according to actual needs, and there is no limitation herein. As shown in FIG. 9 and FIG. 10, which are a solution of an embodiment in which 8 branch bones 212 are provided in a fishbone structure, and the 8 branch bones 212 are taken as an example for description in subsequent figures.

When space and volume of a gas sensor are constant, the larger the number of branch bones 212 is, the smaller a width of a branch bone 212 is.

In an exemplary embodiment, eight gas detection parts A32 are provided on eight strip-shaped support suspension bridges to form eight branch bones, and strip-shaped branch bones serve as sensing parts of a gas sensor, thus having low thermal mass and low power consumption.

In an exemplary embodiment, each branch bone 212, i.e., each gas sensing component, may be used as an independent gas sensor, wherein damage to any of gas sensing components will not affect use of other gas sensing components, thereby compatibility thereof is good.

In an exemplary embodiment, the number of branch bones 212, i.e., the number of gas detection components, may be designed as desired, and the number in an embodiment is only an example, and may be increased or decreased accordingly. Increasing the number of branch bones 212 may cause programmed combinations to be increased in multiple times, thereby expansibility thereof is good.

In an exemplary embodiment, taking a case in which a gas sensor includes eight gas detection components as an example, gas sensitive materials 11 provided on the eight gas detection components may all be different, that is, one gas sensitive material is provided in each gas detection component, and a total of eight gas sensitive materials are provided. In another exemplary embodiment, among eight gas detection components, gas sensitive materials 11 provided in at least two of the gas detection components may be identical, and a detection result may be verified by providing the same gas sensitive material.

Figure 11:
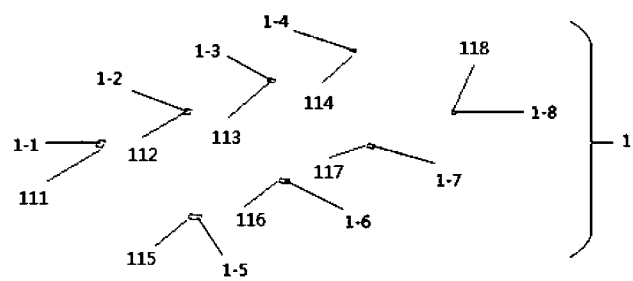
FIG. 11 is a schematic diagram of a gas sensitive material layer according to an exemplary embodiment of the present disclosure.

In an exemplary embodiment, as shown in FIG. 11, a gas sensitive material layer 1 may include eight independent gas sensitive material parts A324: 1-1, 1-2, 1-3, 1-4, 1-5, 1-6, 1-7, and 1-8, which may be made of a same gas sensitive material or multiple different gas sensitive materials, and may be made of any feasible combination of any one or more gas sensitive materials.

In an exemplary embodiment, an electrode detection site 23, i.e., a first opening A325 in FIG. 1, may be disposed in a middle position of each branch bone 212, or disposed on a vertical centerline of a cavity cross-section as shown in FIG. 1.

In an exemplary embodiment, a gas sensitive material 11 may be covered on a position of the electrode detection site 23, for example, may be covered on a first opening A325 between a first detection electrode part and a second detection electrode part, or may be filled inside the first opening A325, as long as respective effective electrical connections with the first detection electrode part and the second detection electrode part are ensured.

Figure 12:
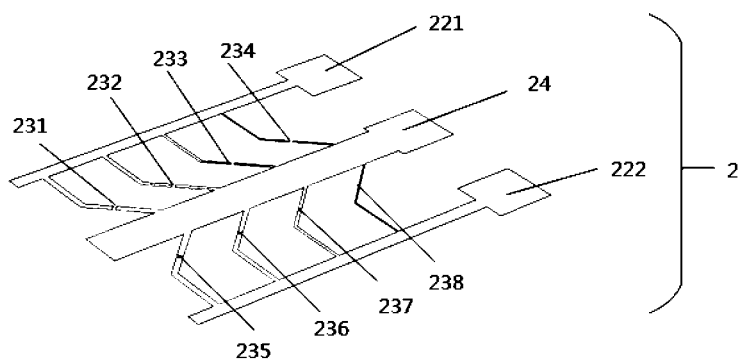
FIG. 12 is a schematic diagram of a gas detection electrode layer according to an exemplary embodiment of the present disclosure.

In an exemplary embodiment, FIG. 12 shows a schematic diagram of a gas detection electrode layer 2, in which a first common ground 24, i.e., a second ground pin A7, may be at a main bone 211, and the first common ground 24 may cooperate with gas detection electrode pins 22 (including a first common gas detection electrode pin 221 and a second common gas detection electrode pin 222 in the figure) to output a gas detection voltage.

In an exemplary embodiment, as shown in FIG. 12, a schematic diagram of the gas detection electrode layer 2 is provided. As may be seen in FIG. 12, it includes a first common ground 24 for constituting a main bone 211, eight strip-shaped detection electrode parts for constituting branch bones 212 (four branch bones 212 are provided on each side of the main bone 211), and gas detection electrode pins. Each strip-shaped detection electrode part includes a first detection electrode part and a second detection electrode part, and there is an electrode detection site between each first detection electrode part and each second detection electrode part, and a total of eight electrode detection sites 23 are provided (including 231, 232, 233, 234 disposed on one side of the main bone 211 and 235, 236, 237, 238 disposed on the other side of the main bone 211, and eight gas sensitive material parts A324 are provided correspondingly). Each second detection electrode part is connected with the first common ground 24, and every four first detection electrode parts are connected with one gas detection electrode pin 22. As shown in the figure, four first detection electrode parts on one side of the main bone are connected with the first common gas detection electrode pin 221, and four first detection electrode parts on the other side of the main bone are connected with the second common gas detection electrode pin 222. A pattern of the gas detection electrode layer shown in the figure is only an example. In other embodiments, a size of a ground pin, a position of a detection pin, an angle between a detection electrode part and the ground pin, a trace position of the detection electrode part and the detection pin, etc. may all be adjusted, and correspondingly, positions of corresponding components in other layers should also be adjusted.

The electrode detection sites 231, 232, 233, 234, 235, 236, 237, and 238 may be respectively covered with the aforementioned gas sensitive material parts A324: 1-1, 1-2, 1-3, 1-4, 1-5, 1-6, 1-7, and 1-8, and these gas sensitive material parts A324 may be respectively made of gas sensitive materials 111, 112, 113, 114, 115, 116, 117, and 118.

In an exemplary embodiment, when gas detection electrode pins 22 include a first common gas detection electrode pin 221 and a second common gas detection electrode pin 222, as shown in FIGS. 10 and 12, material resistances formed by gas sensitive materials 11 on branch bones 212 on a first side of the main bone 211 constitute a parallel resistance, and a gas detection voltage is outputted through the first common gas detection electrode pin 221; and/or, material resistance formed by gas sensitive materials 11 on branch bones 212 on a second side of the main bone 211 constitute a parallel resistance, and a gas detection voltage is output through the second common gas detection electrode pin 222.

In an exemplary embodiment, after gas sensitive material parts A324 are provided on the electrode detection sites 231, 232, 233, 234, 235, 236, 237, and 238, when the electrode detection sites 231, 232, 233, 234 are electrically connected with the first common gas detection electrode pin 221 through branch bones where they are located, the gas sensitive materials 111, 112, 113, 114 of 1-1, 1-2, 1-3, 1-4 in the gas sensitive material parts A324 form four material resistors connected in parallel; the first common gas detection electrode pin 221 may output a voltage value across the four material resistors in parallel. When the electrode detection sites 235, 236, 237, 238 are electrically connected with the second common gas detection electrode pin 222 through branch bones where they are located, gas sensitive materials 115, 116, 117, 118 of 1-5, 1-6, 1-7, 1-8 in gas sensitive material parts A324 form another four material resistors connected in parallel, and the second common gas detection electrode pin 222 may output a voltage value across the another four material resistors in parallel.

In an exemplary embodiment, when the number of the gas detection electrode pins 22 is one, material resistors formed by gas sensitive materials A324 on the eight branch bones 212 constitute parallel resistors, and a gas detection voltage is output through the gas detection electrode pin 22.

When the gas detection voltage is output, the gas sensor completes detection. In an exemplary embodiment, the obtained gas detection voltage may be combined with other parameters, such as gas concentration, for determining a gas composition. In another exemplary embodiment, after an initial gas detection voltage is obtained, a gas detection voltage spectrum may be obtained by changing a heating temperature of a heater under an individual gas sensitive material one by one, and a gas detected by the gas sensor may be determined by observing a waveform change.

Figure 13:
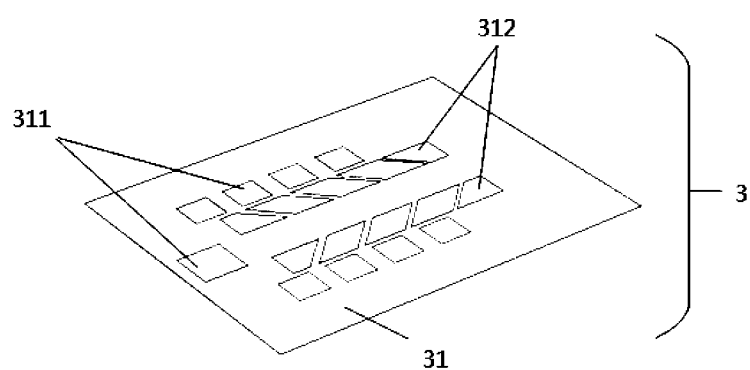
FIG. 13 is a schematic diagram of an isolation film layer according to an exemplary embodiment of the present disclosure.

In an exemplary embodiment, as shown in FIG. 13, it is a schematic diagram of an isolation film layer. The isolation film layer 3 may be used for isolating the gas detection electrode layer 2 and the heater layer 4. The isolation film layer 3 may include a first insulation film 31; and a first window 311 and a second window 312 may be provided on the first insulation film 31. The first window 311 is configured to expose a heating electrode pin of a heater and a first ground pin. The second window 312 is configured to expose a cavity, the second window may be understood as an etching window, i.e. a window for etching the cavity. The second window may include multiple sub-windows; and may be set to be in a first shape, and the first shape may have a shape formed by a vertical projection of a hollow part of the fishbone structure 21 on the isolation film layer 3.

In an exemplary embodiment, the second window 312 may be a window for wet etching.

In an exemplary embodiment, the isolation film layer 3 is an insulation film for isolating the heater layer 3 and the gas detection electrode layer 2, the first window 311 is an electrode pin window of the heater, and configured to expose a Pad (pin) of the heater and a ground pin, and the second window 312 is an etching window.

Figure 14:
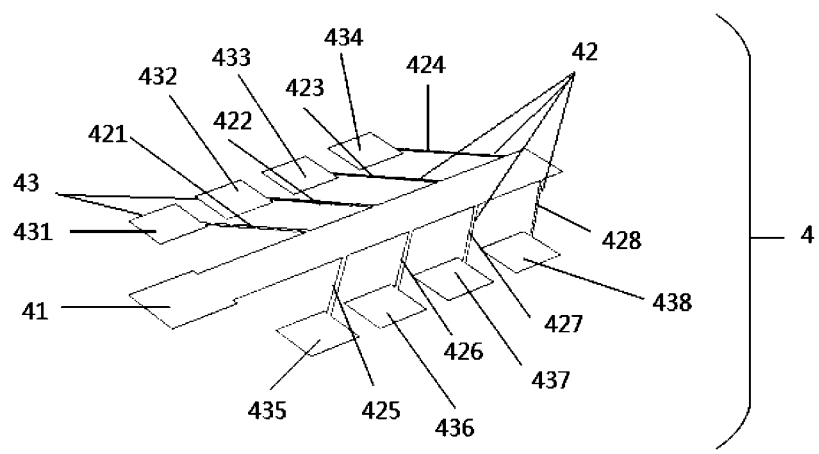
FIG. 14 is a schematic diagram of a heater layer according to an exemplary embodiment of the present disclosure.

In an exemplary embodiment, as shown in FIG. 14, the heater layer 4 may be provided with a fishbone-shaped heating component corresponding to a shape of the fishbone structure 21; the fishbone-shaped heating component may include a second common ground 41 (i.e., a first ground pin A5), a heater 42 (i.e., a strip-shaped heating electrode part A321), and a heating electrode pin 43 (i.e., a heating electrode pin A4). The second common ground 41 may be provided between two cavities for forming a main bone, and eight heaters 42 are located at eight branch bones.

One end of each of the eight heaters 42 is connected with the second common ground 41, and the other ends of the eight heaters 42 are respectively connected with N heating electrode pins 43.

In an exemplary embodiment, FIG. 14 shows a schematic diagram of an embodiment of a fishbone-shaped heating component. Each side of a main bone in the fishbone-shaped heating component may be provided with four branch bones, each of which is provided with a heater, for example, a first side of the main bone may be provided with heaters 421, 422, 423, 424, and a second side of the main bone may be provided with heaters 425, 426, 427, 428.

In an exemplary embodiment, eight heating electrode pins disposed correspondingly and connected with the heaters 421, 422, 423, 424, 425, 426, 427, 428 are 431, 432, 433, 434, 435, 436, 437, and 438.

In an exemplary embodiment, all heaters share one ground, effectively reducing the number of pins (Pads).

In a solution of this exemplary embodiment, 8 gas detection components may be provided with 11 or 12 Pads in total, i.e., 11 or 12 electrode pins (including 8 heating electrode pins, 1 or 2 gas detection electrode pins, and 2 common ground electrode pins) are required, which greatly reduces the number of pins and is beneficial to a design of leads and related circuits. In this exemplary embodiment, eight gas detection components are integrated on one gas sensor, wherein one gas detection component is equivalent to one conventional gas sensor.

In an exemplary embodiment, each heater may be designed to have a different width, and when a same heating voltage is applied through a heating electrode pin, due to different Joule heats generated, a same heating temperature or different heating temperatures may be obtained by cooperating with branch bones with different widths.

Generally, semiconductor gas sensitive materials have different sensitivities for different gases at different working temperatures, a same sensor may respond best to a gas A at 300 degrees, while may respond best to a gas B at 400 degrees. At present, in an application, a gas sensor will apply a fixed voltage to its heater to make a gas sensitive material reach a temperature. If it is wanted to detect multiple gases at the same time, multiple different gas sensors need to be set and different power supply voltages are needed. However, by adopting the gas sensor in the embodiment of the present disclosure, different voltages may be applied to heaters in different gas detection components through heating electrode pins, and each gas detection component is an independent gas sensor. Therefore, a utilization rate is high and a cost is low when a measurement for multiple gases is performed.

In an exemplary embodiment, $2^N$ different sensitive voltages may be obtained by programming an input heating voltage, facilitating an application of recognition of multiple gases, expanding an application range of the gas sensor, and improving a utilization rate of the gas sensor.

In an exemplary embodiment, any one or more of the 8 heating electrode pins may be combined to obtain multiple combinations; wherein, different heating voltages may be applied by heating electrode pins in each combination, or a same heating voltage is applied by at least two heating electrode pins, and $2^8$ voltage applications may be obtained and $2^8$ heating temperatures may be obtained accordingly.

Figure 15:
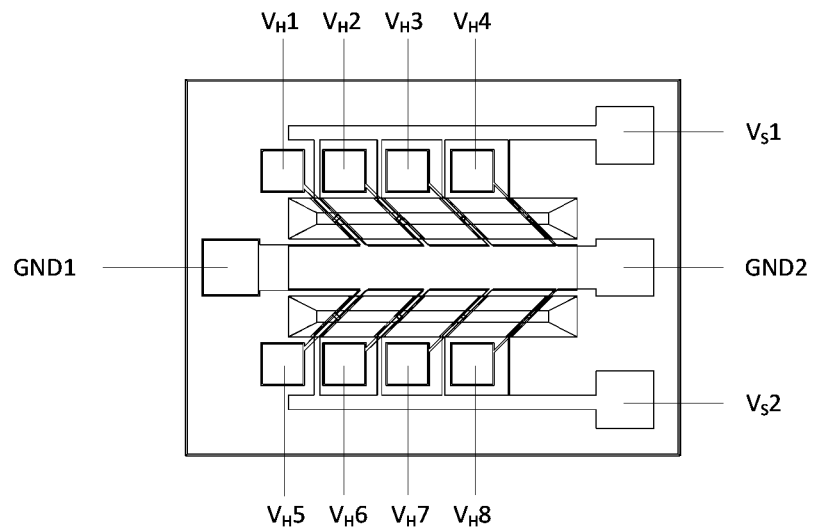
FIG. 15 is a schematic diagram of voltage input and output of a MEMS gas sensor according to an exemplary embodiment of the present disclosure.

In an exemplary embodiment, as shown in FIG. 15, FIG. 15 is a schematic diagram of voltage input and output of a fishbone-shaped programmable MEMS gas sensor. $V_H1$, $V_H2$, $V_H3$, $V_H4$, $V_H5$, $V_H6$, $V_H7$, and $V_H8$ are heating voltages on a heater, GND1 is a ground (i.e., a second common ground 41) common to the heating voltages, and $V_S1$ and $V_S2$ are material sensitive voltages (i.e., a voltage output by a first common gas detection electrode pin 221 and a voltage output by a second common gas detection electrode pin 222). $V_S1$ may be composed of voltage components $V_S11$, $V_S12$, $V_S13$, $V_S14$, and the four voltage components are partial voltages of material resistances composed of gas sensitive materials on four branch bones 212 on a first side of a main bone 211. $V_S2$ may be composed of voltage components $V_S25$, $V_S26$, $V_S27$, $V_S28$, and the four voltage components are partial voltages of material resistances composed of gas sensitive materials on four branch bones 212 on a second side of the main bone 211. GND2 is a ground common to $V_S1$ and $V_S2$ (i.e. a first common ground 24).

Figure 16:
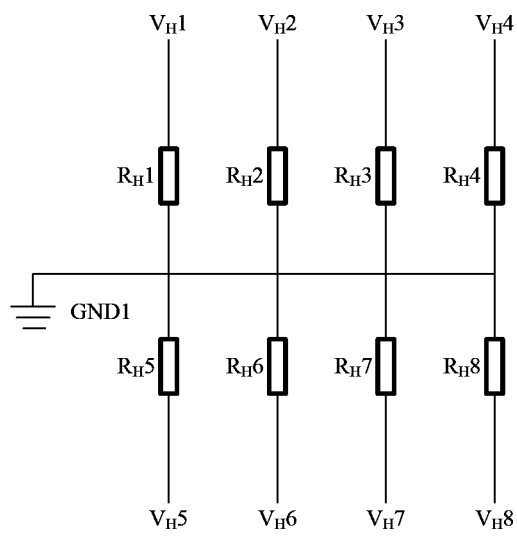
FIG. 16 is an equivalent schematic diagram of a heating circuit of a MEMS gas sensor according to an exemplary embodiment of the present disclosure.

FIG. 16 is an equivalent schematic diagram of a heating circuit of a fishbone-shaped programmable MEMS gas sensor. $R_H1$, $R_H2$, $R_H3$, $R_H4$, $R_H5$, $R_H6$, $R_H7$, and $R_H8$ are resistances of a heater. When $V_HN$ (N=1, 2, 3, 4 . . . , 8) is electrified, Joule heat will be generated on $R_HN$ (N=1, 2, 3, 4 . . . , 8) to heat a gas sensitive material to a working temperature. For example, when $V_H1$ is electrified, Joule heat will be generated on $R_H1$, which will change a resistance of a gas sensitive material 111, while resistances of other materials will not be changed. For another example, when $V_H1$ and $V_H6$ supply power at the same time, Joule heat will be generated on $R_H1$ and $R_H6$, which will change resistances of materials 111 and 116 respectively.

Figure 17:
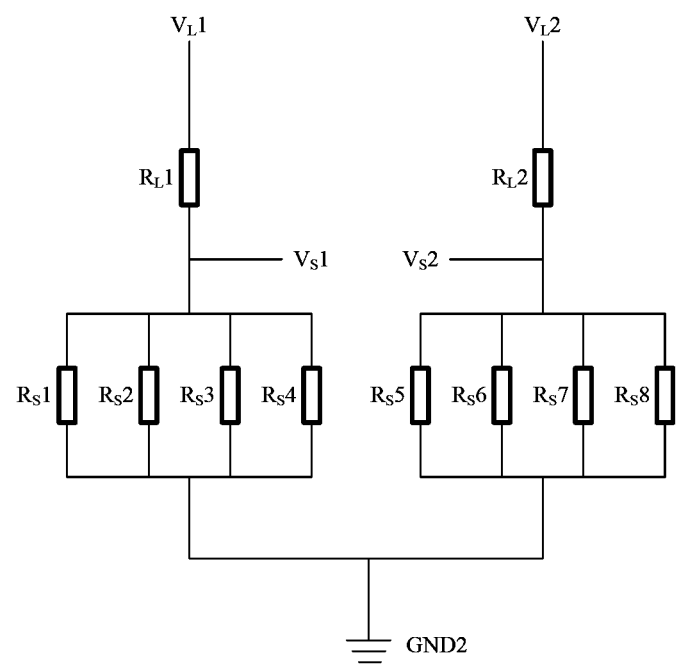
FIG. 17 is a first equivalent schematic diagram of a gas detection circuit of a MEMS gas sensor according to an exemplary embodiment of the present disclosure.

FIG. 17 is a first equivalent schematic diagram of a gas detection circuit in a fishbone-shaped programmable MEMS gas sensor, corresponding to an example with two detection electrode pins. $V_S1$ and $V_S2$ are detection voltages (i.e., material sensitive voltages), $V_L1$ and $V_L2$ are measurement voltages, $R_L1$ and $R_L2$ are matching resistors, $R_S1$, $R_S2$, $R_S3$, $R_S4$, $R_S5$, $R_S6$, $R_S7$, and $R_S8$ represent resistances of gas sensitive materials 111, 112, 113, 114, 115, 116, 117, and 118, respectively. $V_S1$ is changed when any one of $R_S1$, $R_S2$, $R_S3$, and $R_S4$ is changed, and $V_S2$ is changed when any one of $R_S5$, $R_S6$, $R_S7$, and $R_S8$ is changed. A measurement voltage $V_L$ is connected with a gas detection electrode pin through a matching resistor $R_L$. As shown in FIG. 17, $V_S1$ plus a voltage across both ends of $R_L1$ is equal to $V_L1$, and $V_S2$ plus a voltage across both ends of $R_L2$ is equal to $V_L1$. $V_S1$ and $V_S2$ are output voltages of the sensor (hereinafter referred to as output voltages). During in use, $V_S1$ and $V_S2$ may be measured and obtained or a voltage applied across a matching resistor may be measured.

Figure 18:
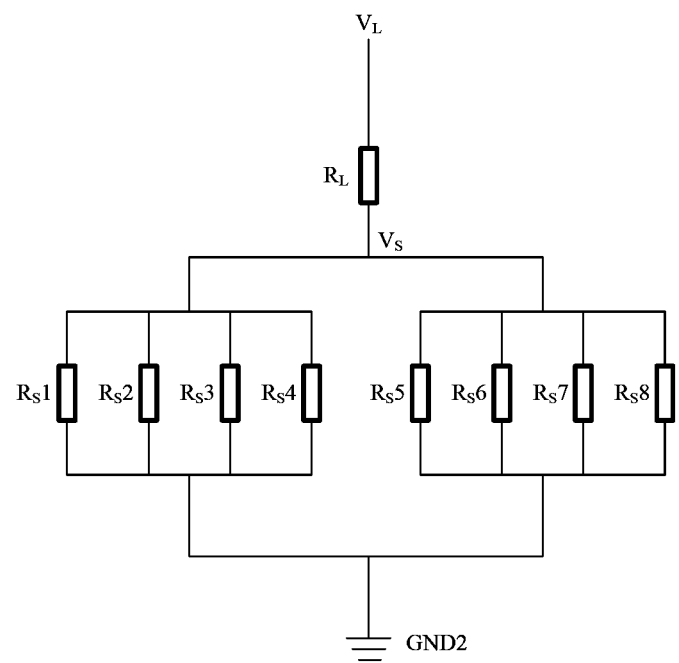
FIG. 18 is a second equivalent schematic diagram of a gas detection circuit of a MEMS gas sensor according to an exemplary embodiment of the present disclosure.

FIG. 18 shows a second equivalent schematic diagram of a gas detection circuit in a fishbone-shaped programmable MEMS gas sensor, corresponding to an example of a detection electrode pin. In FIG. 18, it is equivalent that $V_S1$ and $V_S2$ are connected together to obtain a Vs, and a same matching resistor $R_L$ and measurement voltage $V_L$ are used. When any one of resistors of $R_S1$, $R_S2$, $R_S3$, $R_S4$, $R_S5$, $R_S6$, $R_S7$, and $R_S8$ is changed, the $V_S$ is changed.

In an exemplary embodiment, assuming that $R_HN$ (N=1, 2, 3, 4 . . . , 8) is electrified, which is represented by $V_HN$ (N=1, 2, 3, 4 . . . , 8) as a high level 1 (1 is a fixed positive voltage or a combination of several different fixed positive voltages). No power is represented by a low level 0. Then an input voltage of a heater may be programmed. For example, 1000000 may represent that only $V_H1$ is at a high level, 10010001 may represent that $V_H1$, $V_H4$, and $V_H8$ are at a high level, and there are 28 cases from 00000000 to 11111111, which means that there will be 8! different combinations of material sensitive resistors, and there will be $2^8$ different Vs outputs at the same time. A purpose of detection may be achieved by detecting $V_S1$ and $V_S2$, or $V_S$.

In an exemplary embodiment, the $2^8$ heating temperatures may be arbitrarily combined with one or more gas sensitive materials on 8 branch bones to achieve detection of multiple gases.

Figure 19:
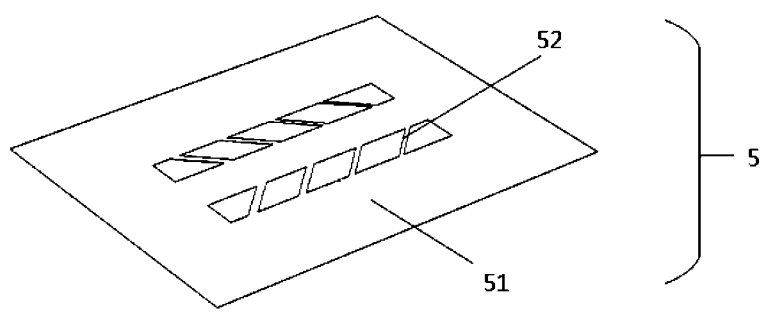
FIG. 19 is a schematic diagram of a support film layer according to an exemplary embodiment of the present disclosure.

In an exemplary embodiment, FIG. 19 is a schematic diagram of a support film layer. The support film layer 5 may be provided with a second insulation film 51; and an etching window may be provided on the second insulation film 51. The etching window is provided in a second shape 52; and the second shape 52 may be the same as the first shape.

In an exemplary embodiment, the support film layer 5 may likewise be an insulation film, the second insulation film 51 may be a support film of a branch bone 212 for serving as a support suspension bridge, and the second shape 52 may be an etching window for forming a shape of a structure of a fishbone-shaped programmable MEMS gas sensor and releasing the structure through a wet etching.

Figure 20:
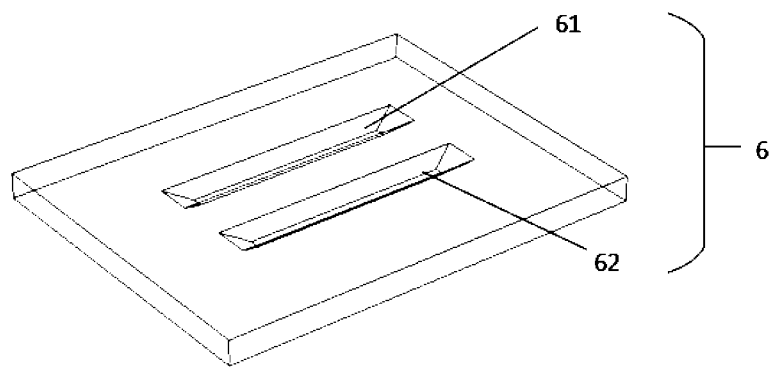
FIG. 20 is a schematic diagram of a base substrate layer according to an exemplary embodiment of the present disclosure.

In an exemplary embodiment, as shown in FIG. 20, a first base substrate may be a silicon base substrate, and the silicon base substrate layer 6 may be provided with two hollow grooves, as a first hollow groove 61 and a second hollow groove 62 shown in FIG. 20, which may correspond to the aforementioned first cavity and the second cavity, respectively.

The two hollow grooves may be symmetrically arranged with a main bone of the fishbone structure 21 as a center.

In an exemplary embodiment, the silicon base substrate layer 6 may be a silicon base substrate of <100>crystal orientation, and 61 and 62 may be hollow grooves formed by wet etching.

The fishbone-shaped MEMS gas sensor described in the above-mentioned embodiments is only one example, and in other exemplary embodiments, various modifications may be made to the above-mentioned fishbone-shaped MEMS gas sensor. In an exemplary embodiment, a half fishbone-shaped MEMS gas sensor may be provided, i.e., including only a main bone and an upper half of branch bones in FIG. 9, or only a main bone and a lower half of branch bones in FIG. 9. In another exemplary embodiment, an asymmetrical fishbone-shaped MEMS gas sensor may be provided, for example, positions of branch bones on both sides of a main bone may be asymmetrical, or quantities of branch bones on both sides of a main bone may be different. Angles between branch bones and the main bone are not limited in the embodiments of the present disclosure.

Figure 21:
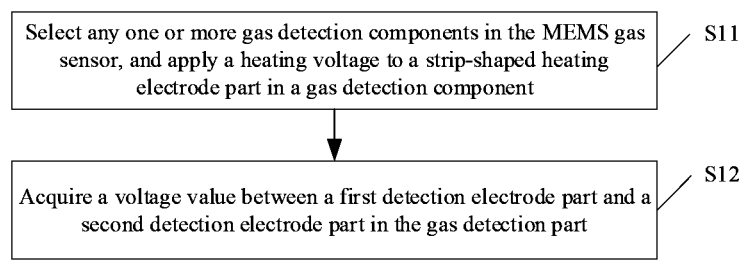
FIG. 21 is a flowchart of a gas detection method of a MEMS gas sensor according to an exemplary embodiment of the present disclosure.

In another aspect, an embodiment of the present disclosure also provides a gas detection method (or referred to as a detection method) of a MEMS gas sensor, the MEMS gas sensor may be the MEMS gas sensor described in any of the above embodiments, that is, any embodiment in solutions of the above MEMS gas sensor embodiments is applicable to the embodiment of the gas detection method, and will not be repeated here. As shown in FIG. 21, when gas detection is performed, the method may include acts S11 and S12.

In S11, any one or more gas detection components (i.e., gas detection parts) in the MEMS gas sensor is selected, and a heating voltage is applied to a strip-shaped heating electrode part in a gas detection component.

In S12, a voltage value between a first detection electrode part and a second detection electrode part in the gas detection part is acquired.

After the above voltage value is acquired, the sensor completes detection. According to the obtained voltage value, gas detection may be achieved.

When a heating voltage is applied to multiple strip-shaped heating electrode parts, voltages of any two strip-shaped heating electrode parts are the same or different.

Acquiring the voltage value between the first detection electrode part and the second detection electrode part may refer to directly collecting the voltage value between the first detection electrode part and the second detection electrode part, or collecting a voltage across both ends of a matching resistor and calculating to obtain the voltage value in combination with a measured voltage.

In an exemplary embodiment, multiple different gases may include $2^N$ (N is the number of gas detection components, one gas detection component includes a support suspension bridge and a gas detection part disposed thereon, N is a positive integer) gases.

Figure 22:
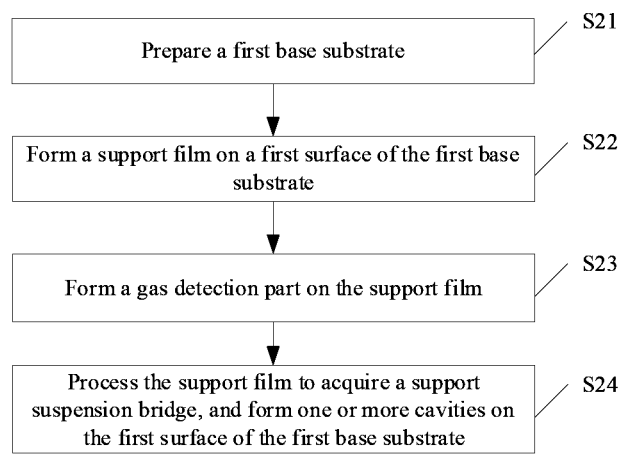
FIG. 22 is a flowchart of a preparation method of a MEMS gas sensor according to an exemplary embodiment of the present disclosure.

In still another aspect, an embodiment of the present disclosure also provides a preparation method of a MEMS gas sensor, wherein the MEMS gas sensor is the gas sensor of any one of the above embodiments. A "patterning process" in this embodiment includes, but is not limited to, deposition of a film layer, coating of a photoresist, mask exposure, development, etching, stripping of a photoresist, and other treatments. As shown in FIG. 22, the method may include acts S21 to S24.

In S21, a first base substrate is prepared.

In an exemplary embodiment, the first base substrate may be, for example, a silicon-based base substrate.

For example, a single-sided or double-sided polished silicon wafer with <100>crystal orientation may be selected as the first base substrate.

In S22, a support film is formed on a first surface of the first base substrate.

In an exemplary embodiment, the forming the support film on the first surface of the first base substrate may include: depositing a single-layer film or a composite film of a first silicon compound with a first preset thickness on the first surface of the first base substrate as the support film.

For example, the support film may be a silicon oxide film, a silicon nitride film, or a composite film composed of a silicon oxide layer and a silicon nitride layer, and it may be a set of silicon oxide layers and silicon nitride layers or may be multiple sets of silicon oxide layers and silicon nitride layers. The silicon oxide layer and/or the silicon nitride layer may be sequentially grown on the first surface of the first base substrate by means of thermal oxidation, plasma enhanced chemical vapor deposition, or low pressure chemical vapor deposition, etc.

In an exemplary embodiment, the method may further include: depositing a second silicon compound with a second preset thickness as a protective film on a second surface (e.g., a surface opposite to the first surface) of the first base substrate after the support film is formed on the first surface of the first base substrate. In an exemplary embodiment, materials for forming films on the first surface and the second surface may be the same or different. In addition, the films on the first surface and the second surface may be formed simultaneously or sequentially.

In S23, a gas detection part is formed on the support film, wherein the gas detection part includes a strip-shaped heating electrode part, an insulation layer, a strip-shaped detection electrode part, and a gas sensitive material part, which are stacked sequentially. The strip-shaped detection electrode part includes a first detection electrode part and a second detection electrode part, a first opening is provided between the first detection electrode part and the second detection electrode part, the gas sensitive material part is disposed at a position of the first opening, a first end of the gas sensitive material part is connected with the first detection electrode part, and a second end of the gas sensitive material part is connected with the second detection electrode part.

In an exemplary embodiment, a gas detection part, a heating electrode pin, a first ground pin, a detection electrode pin, and a second ground pin may be formed on the support film.

Figure 23:
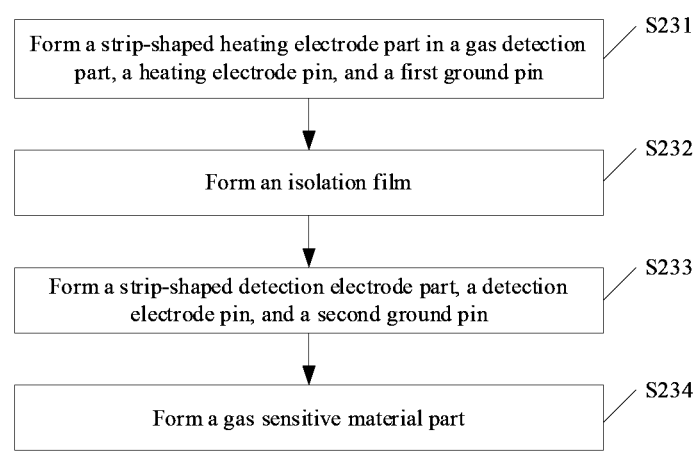
FIG. 23 is a flowchart of a method of preparing a gas detection part, a heating electrode pin, a first ground pin, a detection electrode pin, and a second ground pin on a support film according to an exemplary embodiment of the present disclosure.

In an exemplary embodiment, as shown in FIG. 23, the forming the gas detection part, the heating electrode pin, the first ground pin, the detection electrode pin, and the second ground pin on the support film may include acts S231 to S234.

In S231, a strip-shaped heating electrode part in the gas detection part, a heating electrode pin, and a first ground pin are formed on the support film.

Optionally, in an exemplary embodiment, a lead may also be formed between the heating electrode part and the heating electrode pin, and/or a lead is formed between the heating electrode part and the first ground pin. Whether a lead is formed may be determined according to a distance between the heating electrode part and a pin.

In an exemplary embodiment, the above act S231 may include: depositing a metal body with a third preset thickness on one or more first regions on the support film as the strip-shaped heating electrode part, and depositing a metal body with a third preset thickness on one or more second regions other than the first regions as the heating electrode pin and the first ground pin.

Optionally, in an exemplary embodiment, a lead may also be formed between the heating electrode pin and the heating electrode part, and/or a lead is formed between the first ground pin and the heating electrode part.

For example, a metal thin film is deposited on the support film, and the metal thin film is patterned through a patterning process to form a pattern of a heater layer, including a pattern of the heating electrode part, a pattern of the heating electrode pin, and a pattern of the first ground pin.

In S232, an isolation film is formed on an upper layer of the strip-shaped heating electrode part, the heating electrode pin, and the first ground pin on the first base substrate; wherein the isolation film on the strip heating electrode part constitutes an insulation layer (a strip-shaped insulation layer) between the strip-shaped heating electrode part and the strip-shaped detection electrode part.

The forming the isolation film on the upper layer of the strip-shaped heating electrode part, the heating electrode pin, and the first ground pin on the first base substrate may include: depositing a third silicon compound with a fourth preset thickness on the upper layer of the strip-shaped heating electrode part, the heating electrode pin, and the first ground pin on the first base substrate, as the isolation film. For example, an insulation film is deposited on an upper layer of the metal body with the third preset thickness in the act S231. In an exemplary embodiment, an insulation thin film may be patterned through a patterning process to form a pattern of an insulation film layer, i.e., a pattern of an insulation layer.

In S233, a strip-shaped detection electrode part is formed on an insulation layer above the strip-shaped heating electrode, and a detection electrode pin and a second ground pin are formed in a region of a non-insulation layer on the isolation film; wherein the strip-shaped detection electrode part includes a first detection electrode part and a second detection electrode part; a first opening is provided between the first detection electrode part and the second detection electrode part.

During preparation, an isolation film on an upper layer of the heating electrode pin and the first ground pin is etched to expose the heating electrode pin and the first ground pin.

In an exemplary embodiment, the method may also include: forming a lead between the detection electrode pin and a detection electrode part, and/or forming a lead between the second ground pin and the detection electrode part.

The forming the strip-shaped detection electrode part on the insulation layer above the strip-shaped heating electrode and forming the detection electrode pin and the second ground pin in the region of the non-insulation layer on the isolation film, may include: depositing a conductor with a fifth preset thickness on a first part of the insulation layer as the first strip-shaped detection electrode part, and depositing a conductor with a fifth preset thickness on a second part of the insulation layer as the second strip-shaped detection electrode part, wherein a part between the first part and the second part constitutes the first opening. Optionally, the first strip-shaped detection electrode part and the second strip-shaped detection electrode part may be deposited simultaneously; wherein the insulation layer includes the first part, the second part, and a third part, and the third part is located between the first part and the second part, corresponding to the first opening.

For example, a metal thin film is deposited on an upper layer of the isolation film formed in the act S232, and the metal thin film is patterned through a patterning process to form a pattern of a gas detection electrode layer including a pattern of a strip-shaped detection electrode part, a pattern of a detection electrode pin, and a pattern of a second ground pin pattern. A projection of the pattern of the strip-shaped detection electrode part on the base substrate and a position of a projection of the strip-shaped heating electrode part on the base substrate may be all overlapped or may be overlapped in most regions, so as to ensure that the strip-shaped heating electrode part can heat a gas sensitive material between detection electrode parts.

In an exemplary embodiment, after the strip-shaped detection electrode part is formed on the insulation layer above the strip-shaped heating electrode and the detection electrode pin and the second ground pin are formed in the region of the non-insulation layer on the isolation film, the method may further include: processing an isolation film on an upper layer of the heating electrode pin and the first ground pin to expose the heating electrode pin and the first ground pin. In an exemplary embodiment, an isolation film above the heating electrode pin and the first ground pin may be etched using a photolithography process and/or a dry etching process.

In S234, a gas sensitive material part is formed between first openings.

The gas sensitive material part may be prepared by using a gas phase approach, a liquid phase approach, or a solid phase approach. This act may also be performed after an act 24, that is, after a cavity is etched.

In S24, the support film is processed to acquire a support suspension bridge, and one or more cavities are formed on the first surface of the first base substrate, wherein the support suspension bridge is erected at a first edge and a second edge of a cavity opening.

In an exemplary embodiment, the processing the support film to acquire the support suspension bridge may include: releasing out at least two hollow shapes on the support film using a dry etching process (e.g., reactive ion etching) to form the support bridge between the two hollow shapes.

In an exemplary embodiment, the forming one or more cavities on the first surface of the first base substrate may include: releasing out the one or more cavities on the first base substrate using an anisotropic etching liquid of a preset compound.

For example, during etching, the cavity may be penetrated through the first base substrate, or a depth of the cavity may be controlled, so that a gap for heat insulation is left between the gas detection component and a bottom of the cavity.

In an exemplary embodiment, during etching, an isolation film and a support film may be etched layer by layer at one time. When the support film is etched, the support film may be etched by using a reactive ion etching process or an ion beam etching process, a pattern of a support suspension bridge (e.g., a graph at a position of an orthographic projection of the gas detection component) used for supporting a gas detection component and a cavity boundary are defined, a silicon base substrate is exposed to form an etching window, and then the silicon base substrate may be etched through the etching window by using anisotropic wet etching solution of silicon such as tetramethyl ammonium hydroxide or potassium hydroxide, or isotropic wet etching solution, or an isotropic dry etching gas, and the silicon base substrate under the support suspension bridge is hollowed out to form a cavity. Depending on different materials and approaches used for etching, shapes of sidewalls of the cavity may be different (or vertical, or inclined, or curved). For example, a cross-section of an anisotropic etching cavity may be inverted trapezoidal or "V"-shaped, and a cross-section of an isotropic etching cavity is nearly elliptical. One or more cavities may be etched at one time through the above approaches. A strip-shaped support film for supporting the gas detection component at a cavity opening is retained as a support suspension bridge.

Figure 24:
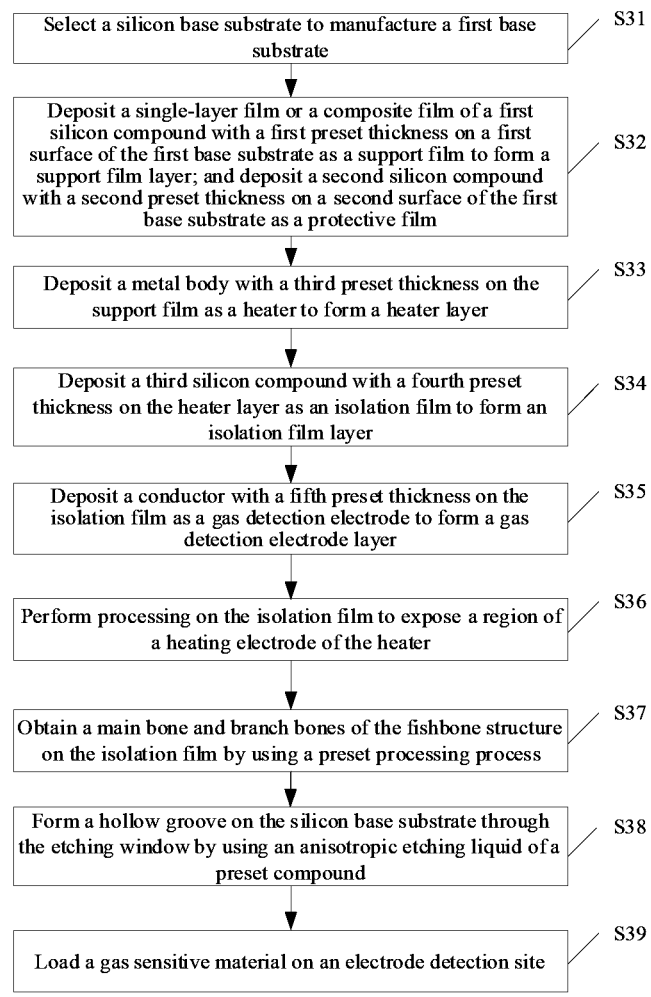
FIG. 24 is a flowchart of a method of preparing each layer of a MEMS gas sensor according to an exemplary embodiment of the present disclosure.

A method of preparing the above fishbone-shaped MEMS gas sensor is described below through an exemplary embodiment. In this exemplary embodiment, as shown in FIG. 24, a silicon base substrate layer, a support film layer, a heater layer, an isolation film layer, a gas detection electrode layer, and a gas sensitive material layer are sequentially prepared, which may include acts S31 to S39.

In S31, a silicon base substrate is selected to manufacture a first base substrate; wherein the first base substrate may include, but is not limited to, a silicon base substrate layer; and the silicon base substrate may include a single-polished or double-polished silicon wafer.

In this exemplary embodiment, a single-polished or double-polished silicon wafer with <100>crystal orientation may be selected as a base substrate.

In S32, a single-layer film or a composite film of a first silicon compound with a first preset thickness is deposited on a first surface of the first base substrate as a support film to form a support film layer; and a second silicon compound with a second preset thickness is deposited on a second surface of the first base substrate as a protective film.

The first preset thickness may include: 1.5 microns to 2.5 microns; the first silicon compound may include: silicon oxide and/or silicon nitride; the second preset thickness may include: 200 nm to 500 nm; and the second silicon compound may include silicon nitride.

A single-layer film or a composite film of a first silicon compound (such as silicon oxide and silicon nitride) may be deposited as a support film on a front surface of a silicon wafer (i.e., the above-mentioned first surface, which usually is a polished surface, or may be a non-polished surface) using Plasma Enhanced Chemical Vapor Deposition (PECVD) or Low Pressure Chemical Vapor Deposition (LPCVD), and a total thickness (i.e., the above-mentioned first preset thickness) may be 2 microns.

In an exemplary embodiment, a second silicon compound (e.g. silicon nitride) of 200 nm to 500 nm (a second preset thickness) may be deposited as a protective film of wet etching on a back surface (i.e., the above-mentioned second surface, which usually is a non-polished surface, or may be a polished surface) of a silicon wafer using PECVD or LPCVD. The protective film may be provided on one or more surfaces of the first base substrate.

In S33, a metal body with a third preset thickness is deposited on the support film as a heater to form a heater layer.

The third preset thickness may include: 150 nm to 250 nm; and a material of the metal body may include platinum.

A metal body (e.g. platinum) with a third preset thickness (e.g., 200 nm) may be deposited on the support film using a photolithography process and a metal coating process as a heater layer.

The photolithography process may be ultraviolet photolithography, and the coating process may be electron beam evaporation coating or magnetron sputtering coating.

In S34, a third silicon compound with a fourth preset thickness is deposited on the heater layer as an isolation film to form an isolation film layer.

The fourth preset thickness may include: 350 nm to 500 nm; and the third silicon compound may include silicon nitride.

A third silicon compound (e.g., silicon nitride) with a fourth preset thickness (e.g., 350 nm to 500 nm) may be deposited as an isolation film using PECVD.

In S35, a conductor with a fifth preset thickness is deposited on the isolation film as a gas detection electrode to form a gas detection electrode layer.

The fifth preset thickness may include: 150 nm to 250 nm; and the metal body may include platinum or gold.

The gas detection electrode layer may be manufactured by using the process as described in the act S233, that is, a conductor with a fifth preset thickness (e.g., 200 nm) is deposited on the isolation film as a detection electrode, and a material of the detection electrode may be platinum or gold.

In S36, processing is performed on the isolation film to expose a region of a heating electrode of the heater.

A photolithography process and a dry etching process may be used for processing to expose the region of the heating electrode of the heater. The dry etching process may be Reactive Ion Etching (RIE) or Inductively Coupled Plasma etching (ICP-Etch).

In S37, a main bone and branch bones of the fishbone structure are obtained through processing on the isolation film by using a preset processing process to form an etching window.

The preset processing process may include a photolithography process and/or a dry etching process. That is, a structure of a main bone and branch bones of a fishbone-shaped programmable gas sensor may be formed by using a photolithography process and a dry etching process (RIE or ICP-Etch).

In S38, a hollow groove is formed on the silicon base substrate through the etching window using an anisotropic etching liquid of a preset compound.

The preset compound may include potassium hydroxide (KOH) or tetramethyl ammonium hydroxide (TMAH) solution. That is, anisotropic etching solution of silicon such as potassium hydroxide or tetramethyl ammonium hydroxide solution may be used for releasing out a structure of a main bone and branch bones, and at the same time, a hollow groove may be formed on the silicon base substrate.

In S39, a gas sensitive material is loaded on an electrode detection site.

In an exemplary embodiment, the act S39 may be performed prior to the act S37 or S38.

A semiconductor gas sensitive material, such as tin oxide, indium oxide, tungsten oxide, or zinc oxide, may be loaded at the electrode detection site.

Figure 25:
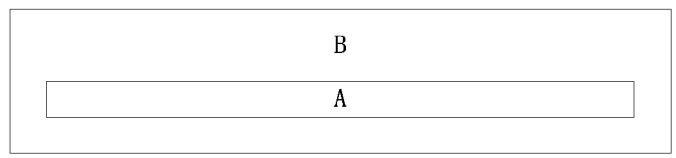
FIG. 25 is a block diagram of composition of a MEMS gas sensor array according to an exemplary embodiment of the present disclosure.

In yet another aspect, an embodiment of the present disclosure also provides a MEMS gas sensor array B, as shown in FIG. 25, and the MEMS gas sensor array includes multiple MEMS gas sensors described in the above embodiments.

In an exemplary embodiment, the gas sensor array B may be composed of multiple gas sensor devices, wherein at least one gas sensor device is the gas sensor A described in the embodiments of the present disclosure.

The above descriptions are only embodiments of the present disclosure, and are not intended to limit the scope of protection of the present disclosure. Those of ordinary skill in the art should understand that modifications or equivalent substitutions may be made to the technical solutions of the embodiments of the present disclosure without departing from the spirit and scope of the technical solutions of the embodiments of the present disclosure, and should all fall within the scope of the claims of the present application.

The invention claimed is:

1. A Micro-Electro-Mechanical System (MEMS) gas sensor, comprising: a first base substrate with a first surface on which a cavity is provided, and a gas detection component disposed at an opening of the cavity, wherein the gas detection component comprises: a strip-shaped support suspension bridge erected at a first edge and a second edge of the opening of the cavity, wherein a strip-shaped support suspension bridge has a strip-shaped support bridge structure, and a gas detection part disposed on a side of the strip-shaped support suspension bridge away from the cavity, wherein the gas detection part comprises a strip-shaped heating electrode part, an insulation layer, a strip-shaped detection electrode part, and a gas sensitive material part, that are stacked sequentially, the strip-shaped detection electrode part comprises a first detection electrode part and a second detection electrode part, a first opening is provided between the first detection electrode part and the second detection electrode part, the gas sensitive material part is provided at a position of the first opening, a first end of the gas sensitive material part is connected with the first detection electrode part, and a second end of the gas sensitive material part is connected with the second detection electrode part;

wherein the MEMS gas sensor further comprises: a heating electrode pin, a first ground pin, a detection electrode pin, and a second ground pin, that are disposed on the first base substrate, wherein the heating electrode pin is connected with a first end of the strip-shaped heating electrode part, and a second end of the strip-shaped heating electrode part is connected with the first ground pin;

a first end of the first detection electrode part is connected with the first end of the gas sensitive material part, and a second end of the first detection electrode part is connected with the detection electrode pin; and a first end of the second detection electrode part is connected with the second end of the gas sensitive material part, and a second end of the second detection electrode part is connected with the second ground pin;

wherein the cavity comprises more cavities, multiple gas detection components at a cavity opening of any one cavity share a pin, or multiple gas detection components at cavity openings of any multiple cavities share a pin;

wherein the multiple gas detection components sharing a pin, comprises: strip-shaped detection electrode parts of the multiple gas detection components share the detection electrode pin.

2. The MEMS gas sensor according to claim 1, wherein the cavity comprises more cavities; wherein gas detection components are respectively disposed at different positions of a cavity opening of any one cavity; or gas detection components are respectively disposed at different positions of a cavity opening of each of any multiple cavities.

3. The MEMS gas sensor according to claim 2, wherein when the MEMS gas sensor comprises multiple gas detection components, gas sensitive materials used by multiple gas sensitive material parts are different;

or gas sensitive materials used by at least two gas sensitive material parts are the same.

4. The MEMS gas sensor according to claim 2, wherein when the cavity comprises multiple cavities, the multiple cavities are arranged in any one or more of the following: a side-by-side arrangement, an arrangement along a straight line, and an arrangement according to a preset geometric shape.

5. The MEMS gas sensor according to claim 4, wherein when any one cavity comprises multiple gas detection components, the multiple gas detection components are arranged in any one or more of the following: a side-by-side arrangement and an arrangement according to a preset geometric shape.

6. The MEMS gas sensor according to claim 2, wherein when any one cavity comprises multiple gas detection components, the multiple gas detection components are arranged in any one or more of the following: a side-by-side arrangement and an arrangement according to a preset geometric shape.

7. The MEMS gas sensor according to claim 6, wherein the cavity comprises multiple cavities, and when an opening of each cavity comprises multiple gas detection components, multiple gas detection components of the multiple cavities are distributed in mirror symmetry.

8. The MEMS gas sensor according to claim 2, wherein the cavity comprises one or more cavities, multiple gas detection components at a cavity opening of any one cavity share a pin, or multiple gas detection components at cavity openings of any multiple cavities share a pin;

wherein the multiple gas detection components sharing a pin, comprises one or more of the following:

strip-shaped heating electrode parts of the multiple gas detection components share the first ground pin;

strip-shaped detection electrode parts of the multiple gas detection components share the second ground pin; and strip-shaped detection electrode parts of the multiple gas detection components share the detection electrode pin.

9. The MEMS gas sensor according to claim 1, wherein the multiple gas detection components sharing a pin, further comprises one or more of the following:

strip-shaped heating electrode parts of the multiple gas detection components share the first ground pin;

strip-shaped detection electrode parts of the multiple gas detection components share the second ground pin.

10. The MEMS gas sensor according to claim 1, wherein the multiple gas detection components at cavity openings of any multiple cavities sharing a pin, comprises:
   m gas detection components at a cavity opening of a first cavity in the any multiple cavities sharing a first ground pin and a second ground pin with n gas detection components at a cavity opening of a second cavity in the any multiple cavities, wherein m and n are both positive integers.

11. The MEMS gas sensor according to claim 10, wherein
   the m gas detection components share a first detection electrode pin, and the n gas detection components share a second detection electrode pin; or,
   the m gas detection components and the n gas detection components share one detection electrode pin.

12. The MEMS gas sensor according to claim 1, wherein,
   the first surface is provided with a first cavity and a second cavity, multiple gas detection components are respectively provided at an opening of each cavity, the first ground pin and the second ground pin are provided between the first cavity and the second cavity in different layers, multiple heating electrode parts in the multiple gas detection components are connected with the first ground pin, and multiple second detection electrode parts in the multiple gas detection components are connected with the second ground pin.

13. A gas detection method of a Micro-Electro-Mechanical System (MEMS) gas sensor, wherein the MEMS gas sensor is the MEMS gas sensor according to claim 1; and the method comprises:
   selecting any one or more gas detection parts in the MEMS gas sensor, applying a heating voltage to a strip-shaped heating electrode part in a gas detection part, and acquiring a voltage value between a first detection electrode part and a second detection electrode part in the gas detection part.

14. The gas detection method according to claim 13, wherein
   when the heating voltage is applied to multiple strip-shaped heating electrode parts, voltages of any two strip-shaped heating electrode parts are the same or different.

15. A Micro-Electro-Mechanical System (MEMS) gas sensor array, wherein the sensor array comprises multiple MEMS gas sensors according to claim 1.

16. A preparation method of a Micro-Electro-Mechanical System (MEMS) gas sensor, wherein the MEMS gas sensor is the MEMS gas sensor according to claim 1; and the method comprises:
   preparing a first base substrate;
   forming a support film on a first surface of the first base substrate;
   forming a gas detection part on the support film, wherein the gas detection part comprises a strip-shaped heating electrode part, an insulation layer, a strip-shaped detection electrode part, and a gas sensitive material part, which are stacked sequentially, the strip-shaped detection electrode part comprises a first detection electrode part and a second detection electrode part, a first opening is provided between the first detection electrode part and the second detection electrode part, the gas sensitive material part is disposed at a position of the first opening, a first end of the gas sensitive material part is connected with the first detection electrode part, and a second end of the gas sensitive material part is connected with the second detection electrode part; and
   processing the support film to acquire a strip-shaped support suspension bridge, and forming one or more cavities on a first surface of the first base substrate, wherein the strip-shaped support suspension bridge is erected at a first edge and a second edge of an opening of a cavity.

17. The MEMS gas sensor according to claim 1, wherein,
   the first surface is provided with a first cavity and a second cavity, multiple gas detection components are respectively provided at an opening of each cavity, a first ground pin and a second ground pin are provided between the first cavity and the second cavity in different layers, multiple heating electrode parts in the multiple gas detection components are connected with the first ground pin, and multiple second detection electrode parts in the multiple gas detection components are connected with the second ground pin.

* * * * *